US012794873B2

(12) United States Patent
Wrenbeck et al.

(10) Patent No.: US 12,794,873 B2
(45) Date of Patent: *Nov. 10, 2026

(54) SYSTEMS AND METHODS FOR IDENTITY AND ACCESS MANAGEMENT WITH EXTENDED TRUST

(71) Applicant: OPEN TEXT INC., Menlo Park, CA (US)

(72) Inventors: Edward Wrenbeck, Ira, MI (US); Gopalakrishnan Brijesh, Novi, MI (US); Apurva Tiwari, Farmington Hills, MI (US); Dileep Kunnath Madathil, Troy, MI (US); Gaspare Bastone, Macomb, MI (US)

(73) Assignee: OPEN TEXT INC., Menlo Park, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/801,006

(22) Filed: Aug. 12, 2024

(65) Prior Publication Data

US 2024/0414145 A1 Dec. 12, 2024

Related U.S. Application Data

(63) Continuation of application No. 17/566,466, filed on Dec. 30, 2021, now Pat. No. 12,074,861.

(60) Provisional application No. 63/132,340, filed on Dec. 30, 2020.

(51) Int. Cl.
*H04L 29/06* (2006.01)
*H04L 9/40* (2022.01)

(52) U.S. Cl.
CPC ...... *H04L 63/0815* (2013.01); *H04L 63/0884* (2013.01); *H04L 63/102* (2013.01); *H04L 63/107* (2013.01)

(58) Field of Classification Search
CPC ............ H04L 63/0815; H04L 63/0884; H04L 63/102; H04L 63/107; H04L 67/02; H04L 67/145
See application file for complete search history.

(56) References Cited

U.S. PATENT DOCUMENTS 10,846,390 B2 * 11/2020 Subramanian .......... G06F 16/86
11,044,604 B2 * 6/2021 Talmor .................... H04L 9/083
(Continued)

*Primary Examiner* — Harunur Rashid
(74) *Attorney, Agent, or Firm* — SPRINKLE IP LAW GROUP

(57) ABSTRACT

An identity and access management (IAM) extended trust server (ETS) can work with a cloud-based IAM platform to authorize a user in a home zone to access a resource such as an enterprise application in an enterprise computing network. The IAM ETS receives a request from the user to access another resource, determines that other resource resides in a geographical zone that is different from the home zone, checks with the cloud-based IAM platform on whether the user is authorized to access the resource in the geographical zone, and responsive to an indication from the cloud-based IAM platform that the user is authorized to access the resource in the geographical zone, redirects a browser on the user device to the resource in the geographical zone without initiating a new session for the user, thereby providing the user with seamless access across multiple zones in a single global session.

14 Claims, 5 Drawing Sheets

(56) References Cited

U.S. PATENT DOCUMENTS

| | | | | |
|---|---|---|---|---|
| 2012/0254429 | A1* | 10/2012 | Feng | H04L 67/564 709/225 |
| 2017/0099187 | A1* | 4/2017 | Dale | H04L 63/0209 |
| 2018/0019986 | A1* | 1/2018 | Manohar | H04W 12/06 |

* cited by examiner

SYSTEMS AND METHODS FOR IDENTITY AND ACCESS MANAGEMENT WITH EXTENDED TRUST

CROSS-REFERENCE TO RELATED-APPLICATIONS

This application is a continuation of, and claims a benefit of priority under 35 U.S.C. § 120 from, U.S. patent application Ser. No. 17/566,466, filed Dec. 30, 2021, entitled "SYSTEMS AND METHODS FOR IDENTITY AND ACCESS MANAGEMENT WITH EXTENDED TRUST," which claims a benefit of priority under 35 U.S.C. § 119(e) from Provisional Application No. 63/132,340, filed Dec. 30, 2020, entitled "SYSTEMS AND METHODS FOR IDENTITY AND ACCESS MANAGEMENT WITH EXTENDED TRUST," both of which are fully incorporated by reference herein for all purposes.

TECHNICAL FIELD

This disclosure relates generally to identity and access management in a distributed computing environment. More particularly, this disclosure relates to an authentication solution for an identity and access management platform.

BACKGROUND OF THE RELATED ART

Managing access in a connected world is a daunting task. This is even more so when using legacy web access management (WAM) products that pre-date data protection regulations such as the European Union's General Data Protection Regulation (GDPR), the European Union's Payment Services Directive (PSD2), the Health Insurance Portability and Accountability Act of 1996 (HIPAA) in the United States, etc. The core security and convenience benefits of using these WAM products have eroded over time due to the cost and risk legacy WAM products pose in today's world, for instance, replicating identity stores, sharing personally identifiable information (PII), programming authorizations into custom web applications, complex patches and maintenance, and user frustration due to latency.

As regulatory compliance requirements have become increasingly more rigorous and complex in recent years, identity and access management (IAM) solutions have become more prevalent and critical. IAM refers to a framework of policies and technologies for ensuring that the proper people in an enterprise have the appropriate access to technology resources. Today, enterprises rely on IAM systems to identify, authenticate, and authorize enterprise users such as enterprise employees who will be utilizing these resources. IAM systems are also utilized to manage hardware and applications that the enterprise users need to access.

Today, IAM systems face many challenges. For example, each application that the enterprise users need to access has its own identity store with credential requirements (e.g., usernames, passwords, email addresses, etc.). Therefore, complexity in managing applications can increase rather fast with the number of applications. The proliferation of credentials can also cause user frustration as they try to remember, reset, and manage their login credentials across all of their applications.

To alleviate user frustration and help users managing their login credentials, an authentication scheme referred to as Single Sign-On (SSO) can be used to allow a user to log in to multiple applications with a single identification (ID) and password. However, the SSO protocol is session-oriented. A session's information is replicated across different trusted parties. This raises a security issue in that if the session used for SSO is stolen, the attacker can access all the resources that are using the SSO system.

In view of the foregoing, there is room for further innovations and improvements in the field of identity and access management.

SUMMARY OF THE DISCLOSURE

This disclosure provides an IAM Extended Trust solution that can achieve multi-zone single sign-on with a scalable, secure, efficient, and more centralized approach. In some embodiments, a system implementing the IAM Extended Trust solution disclosed herein comprises an IAM Extended Trust server (ETS) that extends the web access management (WAM) capability of an enterprise computing network across multiple zones operated by different cloud systems ("IAM clouds").

In some embodiments, the system enables the enterprise to have a global IAM authentication policy that can be managed in an IAM cloud. In some embodiments, the system also allows an administrator to create separate authentication policies per user role and to centrally manage the authentication policies thus created in an IAM cloud, which makes it possible to mandate a second factor for a high privileged access to an on-prem application in the enterprise computing network.

In embodiments disclosed herein, the IAM ETS can enforce enterprise policies where a user session across multiple zones must be restricted to a configured time limit. The IAM ETS can detect any changes in a user's status or authorizations in an IAM cloud and take necessary actions without much delay. Further, the IAM ETS can detect any changes in a user's credentials, such as a password change, password lockout or enrolling in a two-factor, and can force the user to re-authenticate according to the change(s). Moreover, the IAM ETS can detect if a session is terminated by an administrator in an IAM cloud, and can force a logout of the user from accessing any on-prem applications.

With the IAM ETS approach disclosed herein, on-prem applications operating in an enterprise computing network can be protected by a centralized cloud-based IAM platform (hereinafter referred to as the "IAM system"). In some embodiments, the IAM system includes IAM clouds and an IAM ETS.

A user of the enterprise computing network is provisioned in an IAM cloud, so the user's identity is known to the IAM system. The user can be a remote user or an on-prem user. There can be multiple IAM clouds that cover multiple geographical regions or geographical zones referred to as home zones.

In some embodiments, a method for identity and access management with extended trust can comprise receiving, by an IAM ETS, a request from a user device of a user to access a first resource in the enterprise computing network and verifying, with a cloud-based IAM platform, whether the user is authorized to access the first resource. In some embodiments, in response to receiving the request from the user device, the IAM ETS tries to verify whether the request contains a valid authentication token generated by the cloud-based IAM platform. In response to a determination that the request does not contain a valid authentication token generated by the cloud-based IAM platform, the IAM ETS directs the browser on the user device to a login page with input fields for entering credential information of the user. In some embodiments, the authentication token contains claims. The claims can include a reference to a token identifier for the authentication token. The token identifier is utilized in looking up the global session for the user, for instance, in a global session store of the cloud-based IAM platform.

Once authorized, the cloud-based IAM platform generates an authentication token, starts a global session, and communicates the authentication token to the IAM ETS. In turn, the IAM ETS parses the authentication token generated by the cloud-based IAM platform, determines, from the authentication token, a home zone for the user, fetches, from the cloud-based IAM platform, user-specific session information, and authorizes access by the user to the first resource in the enterprise computing network. A browser on the user device is then directed to the first resource in the enterprise computing network. The IAM ETS passes the user-specific session information to the first resource in the enterprise computing network such that the user is able to access the first resource in the global session.

The IAM ETS is operable to check, for instance, on a configurable periodic basis, with the cloud-based IAM platform on whether a change affecting the global session has occurred. Non-limiting examples of such a change can include a policy change, a user entitlement change (e.g., due to a role change of the user).

In some embodiments, the IAM ETS may receive a request from the user to access a second resource, determines that the second resource resides in a geographical zone that is different from the home zone, checks with the cloud-based IAM platform on whether the user is authorized to access the second resource in the geographical zone, and, responsive to an indication from the cloud-based IAM platform that the user is authorized to access the second resource in the geographical zone, redirects the browser on the user device to the second resource in the geographical zone without initiating a new session for the user.

One embodiment comprises a system comprising a processor and a non-transitory computer-readable storage medium that stores computer instructions translatable by the processor to perform a method substantially as described herein. Another embodiment comprises a computer program product having a non-transitory computer-readable storage medium that stores computer instructions translatable by a processor to perform a method substantially as described herein. Numerous other embodiments are also possible.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions, and/or rearrangements may be made within the scope of the disclosure without departing from the spirit thereof, and the disclosure includes all such substitutions, modifications, additions, and/or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. Note that the features illustrated in the drawings are not necessarily drawn to scale.

DETAILED DESCRIPTION

The invention and the various features and advantageous details thereof are explained more fully with reference to the non-limiting embodiments that are illustrated in the accompanying drawings and detailed in the following description. Descriptions of well-known starting materials, processing techniques, components, and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions, and/or rearrangements within the spirit and/or scope of the underlying inventive concept will become apparent to those skilled in the art from this disclosure.

Figure 1:
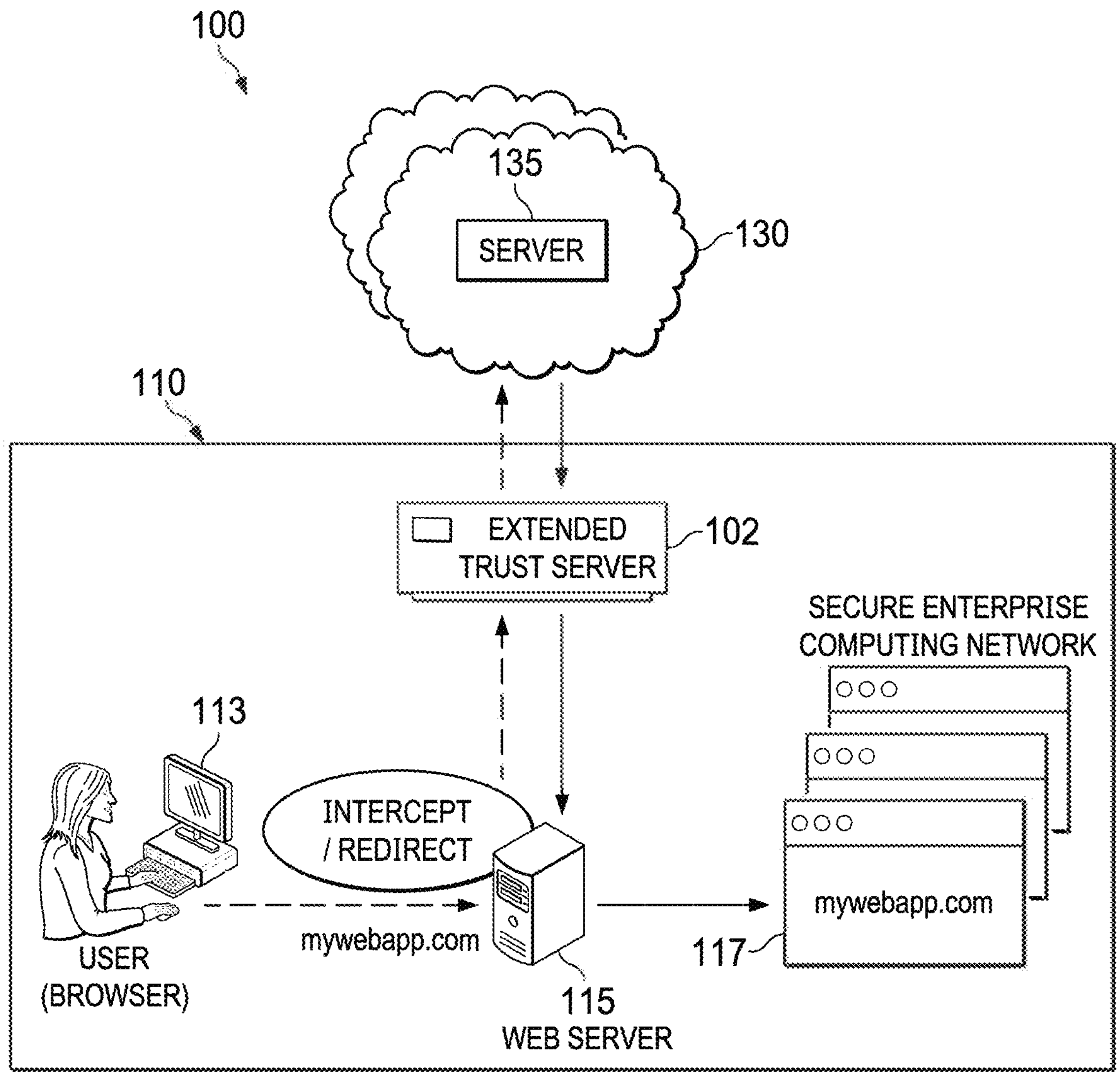
FIG. 1 is a diagrammatic representation of an example architecture for implementing an IAM Extended Trust solution according to some embodiments disclosed herein.

FIG. 1 is a diagrammatic representation of an example architecture for implementing the IAM Extended Trust solution according to some embodiments disclosed herein. As alluded to above, the core security and convenience benefits of legacy web access management (WAM) products have eroded due to the cost and risk legacy WAM products pose in today's world—all of which are unnecessary: replicating identity stores, sharing PII, programming authorizations into custom web applications, complex patches and maintenance, and user frustration due to latency.

The IAM Extended Trust solution disclosed herein provides a new approach to WAM that streamlines single sign-on to web applications within, between, and across enterprise domains. The new WAM approach disclosed herein can provide enterprises with a highly performant and scalable single sign-on solution that brokers trust within, between, and across enterprise domains where fuller standards-based protocols (e.g., SAML, OpenID Connect) are not required.

With the new WAM approach disclosed herein, on-prem applications (e.g., enterprise web-based applications) operating in an enterprise computing network can be protected by an IAM ETS working in conjunction with a centralized cloud-based IAM platform. In some embodiments, the IAM ETS can be considered a lightweight WAM component of the IAM Extended Trust solution disclosed herein. This lightweight WAM component maintains a list of protected resources (e.g., resources addressable via universal resource locators or URLs) and/or endpoints of the enterprise computing network and delegates all identity-related activities to the IAM system using application programming interface (API) calls.

In some embodiments, another lightweight WAM component of the IAM Extended Trust solution disclosed herein can be interceptors that intercept and redirect requests for protected resources to the IAM ETS. As a non-limiting example, these interceptors can be implemented as plug-ins for web servers.

As shown in FIG. 1, in some embodiments, an IAM system 100 implementing an IAM Extended Trust solution disclosed herein can comprise an IAM ETS 102 bidirectionally connected to a cloud-based IAM platform 130 having an IAM cloud server 135 and to a web server 115 operating in an enterprise computing network 110. In some embodiments, the cloud-based IAM platform is operable to provide a plurality of functionalities, including Single Sign-On (SSO) management, policy management, fine-grain authorizations, role management, authorization management, identity verification, multifactor authentication adaptive authentication, and so on, as well as a secure token service and a cloud directory. In some embodiments, IAM cloud server 135 is operable to provide immutable records of events concerning user identities to IAM ETS 102. These events are known to those skilled in the art and thus are not further described herein.

In the example of FIG. 1, IAM ETS 102 works in conjunction with cloud-based IAM platform 130 to provide user 113 with SSO to enterprise applications 117 running in enterprise computing network 110. However, unlike the SSO protocol which replicates a session's information across different trusted parties. IAM ETS 102 leverages a centralized session data store in cloud-based IAM platform 130 to enable a global session in which user 113 can be authenticated once across multiple zones.

That is, after user 113 is logged to enterprise application 117 in through IAM ETS 102, even if user 113 requests access to an enterprise application running in a different zone, user 113 is still in the global session and there is no need to start a new session. Because session information is centrally stored in the cloud on cloud-based IAM platform 130, there is no need to share or replicate session information across different domains (e.g., for different web-based applications) or rely on the user's browser cookie storage. This is further illustrated in FIG. 2.

Figure 2:
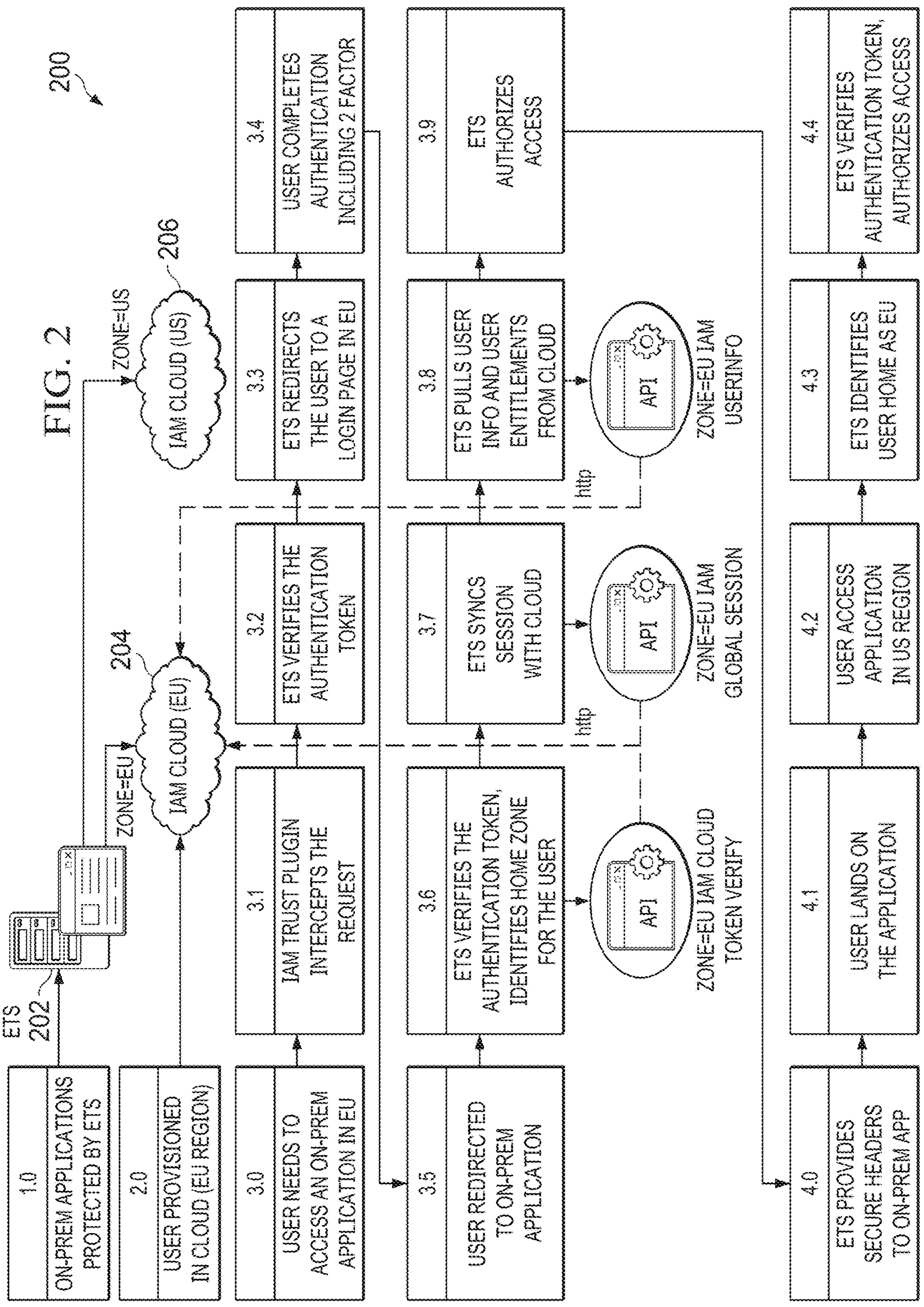
FIG. 2 shows example operations by a centralized cloud-based IAM system according to some embodiments disclosed herein.

In the example of FIG. 2, an IAM system 200 can include an IAM ETS 202 configured for protecting enterprise applications (step 1.0). A user of an enterprise computing network is provisioned (e.g., by an administrator of an enterprise that owns and/or operates the enterprise computing network) in an IAM cloud (e.g., IAM Cloud (EU) 204), so the user's identity is known to the IAM system (step 2.0). The user can be a remote user or an on-prem user. There can be multiple IAM clouds that cover multiple geographical regions or geographical zones (e.g., Europe, U.S., etc.) referred to as home zones.

In the example shown in FIG. 2, the user's home zone is "EU". A novel feature of the invention is that the user can sign in once to the user's home zone (e.g., to access an application hosted on a server running on the premises of the user's employer) and the user can (with the proper entitlement) access an application hosted in another zone (e.g., IAM Cloud (US) 206) in the same session without having to sign in again.

In some embodiments, an IAM ETS plugin can run within the user's browser (step 3.0) and intercept the user's request (step 3.1) to access an on-prem application in the EU (which is the user's home zone in the example of FIG. 2). More specifically, an IAM ETS plugin running in the user's browser is operable to intercept and send the user's request to the IAM ETS (e.g., through a web server such as web server 115 shown in FIG. 1). In turn, the IAM ETS tries to verify whether the request contains a valid authentication token (step 3.2).

Initially (step 3.0), the request contains no authentication token, so the user's browser is redirected to a login page where the user can provide credential information (e.g., through input fields on the login page) (step 3.3). The IAM ETS checks for correctness and completeness of a 2-factor authentication (step 3.4) and, once the user has completed the input process, redirects the user's browser to the requested on-prem application (step 3.5) and passes the authentication information to the cloud for verification (step 3.6).

Once verified, the cloud (e.g., cloud-based IAM platform 130 shown in FIG. 1) generates an authentication token and starts a global session. The IAM ETS parses the authentication token, determines the user's home zone from the authentication token, checks with the cloud to see if anything has changed that might affect the session (e.g., due to a policy change, entitlement change, etc.) (step 3.7), pulls the up-to-date user-specific session information (e.g., user identifier, session identifier, user-specific entitlement, etc.) (step 3.8), and authorizes user access (step 3.9) and passes all the information to the on-prem application (which is a web-based application) (step 4.0). The user can then access the on-prem application (step 4.1).

In some embodiments, the IAM ETS can continuously reach out to the IAM cloud (e.g., via an IAM cloud service) at a configurable time interval (e.g., 30 seconds, one minute, two minutes, etc.) to check on user status. For instance, the IAM ETS may check to see if the authentication token is still valid or whether something has changed since the last check (e.g., the user has a new entitlement due to a role change). The IAM ETS otherwise operates independently of the IAM cloud service.

In some embodiments, the IAM ETS does not store any PII information. The IAM ETS only requires a user's unique UUID, which is a globally unique identifier issued by the IAM cloud in order to pull the user's entitlements from the IAM cloud.

The user may wish to access another application (e.g., by opening a new window or tab and directing the browser to another web-based application or by selecting a link from within the on-prem application which redirects the user to another web-based application) (step 4.2). The request to access another application is again intercepted and provided to the IAM ETS which, in turn, determines that the requested application runs in another zone (e.g., the requested application is hosted on a server machine running in a data center in the U.S.) (step 4.3).

Instead of starting a new session, the IAM ETS uses the user's existing authentication token for the home zone (e.g., EU) to check with the cloud to see if the user is allowed or otherwise authorized (per the user's entitlement) to access the requested application running in another zone (step 4.4). If so, the user's browser is redirected to the requested application and the user is still in the global session.

Figure 3:
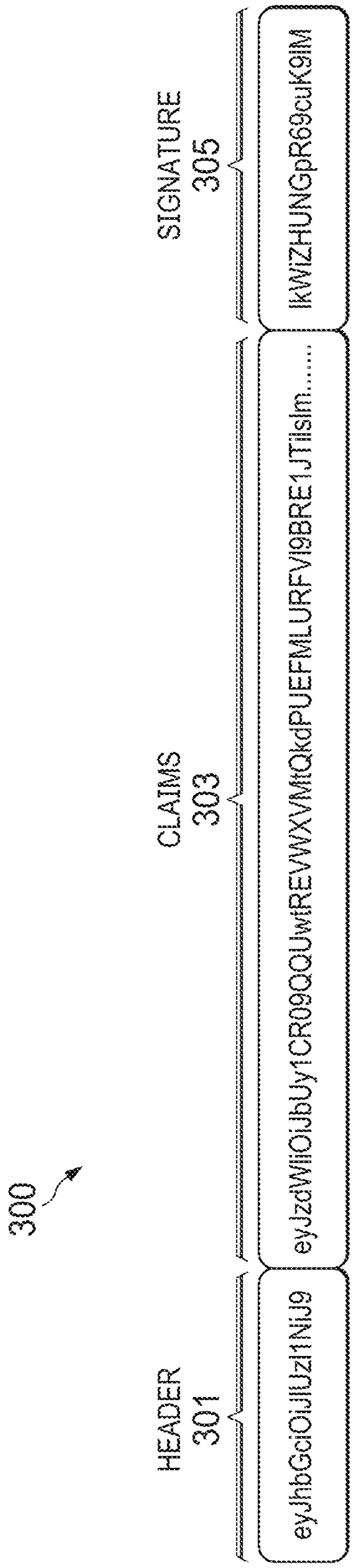
FIG. 3 shows a data structure of an IAM authentication token according to some embodiments disclosed herein.

FIG. 3 shows an example of a data structure of an IAM authentication token 300 according to some embodiments. IAM authentication token can be implemented as a type of JavaScript Object Notation (JSON) Web Token (JWT). JWT is an open standard (RFC 7519) that defines a compact and self-contained way for securely transmitting information between parties as a JSON object. This information can be verified and trusted because it is digitally signed using a signing algorithm.

A JWT is structured with a header section, a claims section, and a signature section. In the example of FIG. 3, the data structure of IAM authentication token 300 has the following sections: the header section 301, the claims section 303 and the signature section 305.

The header section typically has two parts. The first part identifies the type of the token (e.g., "JWT") and the second part indicates the signing algorithm being used (e.g., RSA, HMAC SHA256, etc.).

The claims section contains claims. Here, the term "claims" refers to a type of attribute signed by an authority (e.g., an identity platform such as an IAM cloud) for a subject (e.g., an entity such as a user). Claims are statements about this entity and data. According to the Internet Engineering Task Force (IETF), the claims in an IAM authentication token are encoded as a JSON object that is used as the payload of a JSON Web Signature (JWS) signature or as the plain text of a JSON Web Encryption (JWE) structure, enabling the claims to be digitally signed and/or integrity-protected with a Message Authentication Code (MAC) and/or encryption.

The signature section contains a signature that is created by encoding the header and the claims, and signing using the signing algorithm. The resulting signature is used to verify whether an accompanying message has been tampered.

Below is a non-limiting example of an encoded IAM authentication token.

In the above example, the claims are defined as follows:

| Claim | Description |
|---|---|
| sub | Identifies the subject/user to whom the token is issued |
| jti | Reference to the token identifier which will be used to look up the respective user session in a global session store in an IAM cloud |
| aud | Identifies the tenant to whom this token is intended |
| Iss | Identifies the issuer |
| Iat | Issued at |
| Exp | Expires at |
| userHomeZone | Region which is identified as user's home zone (e.g., US, EU, AP, etc.) |

This type of authentication token follows the JWT specification in which the claims are the main body. Other implementations (e.g., Security Assertion Markup Language or SAML) are also possible.

Figure 4:
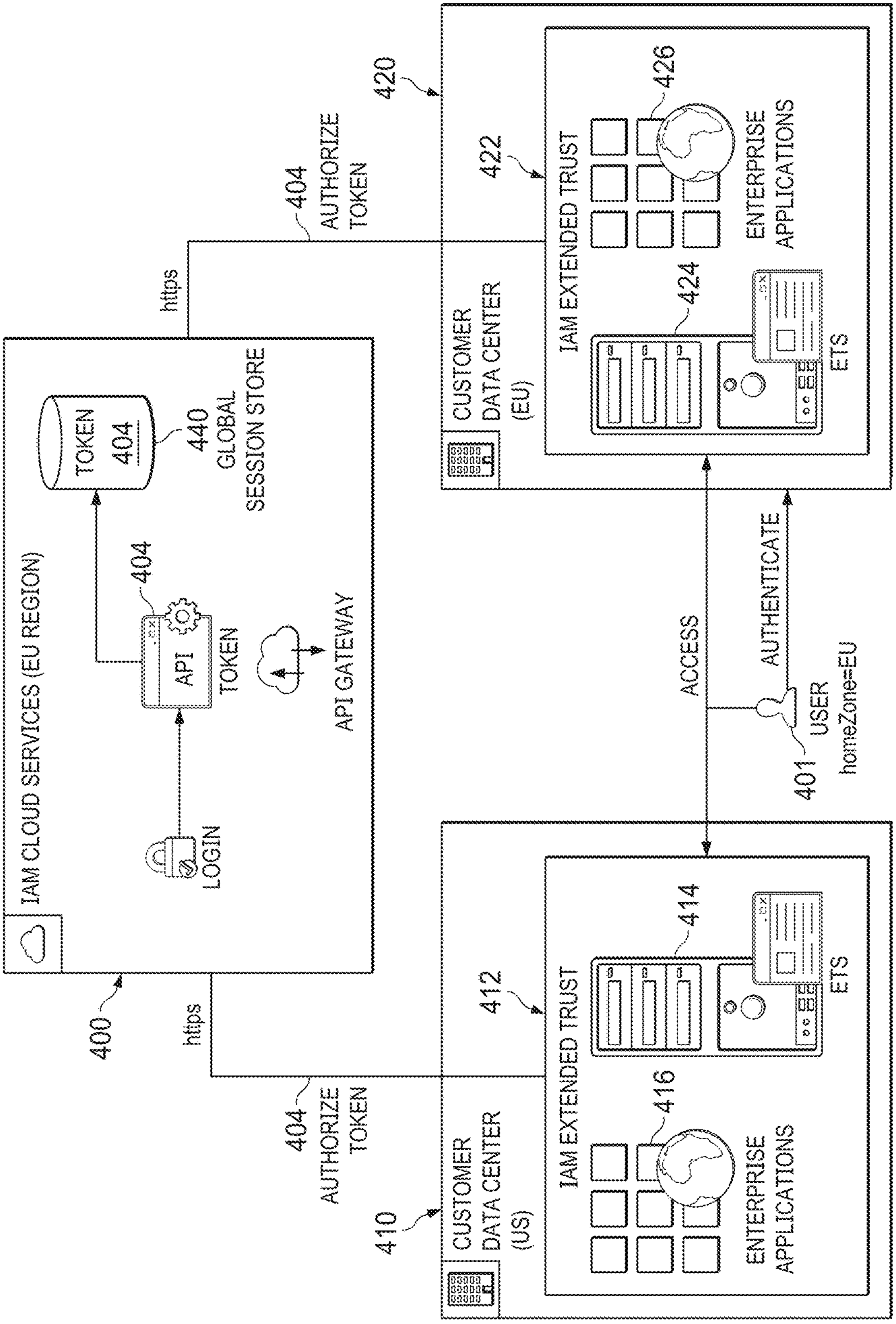
FIG. 4 diagrammatically represents an example of communication paths and data flows among a centralized cloud-based IAM platform and multiple zones according to some embodiments disclosed herein.

FIG. 4 diagrammatically represents an example of communication paths and data flows among a centralized cloud-based IAM platform (e.g., IAM system 400) and multiple zones (e.g., US customer data center 410 and EU customer data center 420). In this example, US customer data center 410 implements an IAM Extended Trust solution 412 having an IAM ETS 414 for enterprise applications 416 and EU customer data center 420 implements an IAM Extended Trust solution 422 having an IAM ETS 424 for enterprise applications 426. Each IAM ETS is capable of authorizing a user against the user's home zone. As discussed above, a home zone is where the user's identity resides.

{Header}eyJhbGciOiJlUzl1NiJ9.{claims}eyJzdWliOiJbUy1CR09QQUwtREVWXVMtQkd
PUEFMLURFVl9BRE1JTilslmN1aWQiOiJbUy1CR09QQUwtREVWXVMtQkdPUEFMLU
RFVl9BRE1JTilslnN1YmplY3RJbmV0ljoiMjA5LjEyNC40My4yMSlslnN1YmplY3QiOiJbU
y1CR09QQUwtREVWXVMtQkdPUEFMLURFVl9BRE1JTilslmlzcyl6lmh0dHBzOlwvXC9
vcGVudGV4dC5jb21cL2lhbSlslnVzZXJJZCl6ljEzNjAwMilslnN1YmplY3RUeXBlljoicGVy
c29uliwiaW5zdGFudCl6MTYwNDc2Mjk5MDc5NCwiaXNVc2VyQ29uZmlndXJlZCl6dHJ1
ZSwiYXVkljoiaHR0cHM6XC9cL29wZW50ZXh0LmNvbVwvaWFtXC9TLUJHT1BBTC1E
RVYiLCJ1c2VySG9tZVpvbmUiOiJ1cylslnNlcnZpY2UiOiJBVVRlTilslm1mYUF1dGhlbnR
pY2F0ZWQiOmZhbHNlLCJyZWFsbSl6llMtQkdPUEFMLURFVilslm1mYVJlcXVpcmVkljp
mYWxzZSwic2NvcGVzljpblm9wZW5pZCJdLCJleHAiOjE2MDQ3OTg5OTAslmlhdCl6MT
YwNDc2Mjk5MCwianRpljoiMmVlY2RkYmYtNDVmMC00NWM5LWlxNDltZDcxOTg0ZjZl
OTFjln0.{signature}kWiZHUNGpR69cuK9lM2UajHll1XhFocjhMEDzZ0ohl Below is a non-limiting example of a decoded IAM authentication token and the claims that it represents.

Header

```
{
  "typ":"JWT",
  "alg": "RS256"
}
```

Claims

```
{
  "sub": "ffd2dcea-212a-11eb-adc1-0242ac120002",
  "iss": "https://opentext.com/iam",
  "aud": "https://opentext.com/iam/S-CLOUDIAM-DEV",
  "userHomeZone": "EU",
  "exp": 1604798990,
  "iat": 1604762990,
  "jti": "2eecddbf-45f0-45c9-b142-d71984f6e91c"
}
```

In the example of FIG. 4, IAM ETS 424 is operable to authorize user 401 of EU customer data center 420 such that user 401 can access enterprise applications 426. Specifically, IAM ETS 424 communicates with IAM system 400 to obtain authentication token 404. IAM ETS 424 validates authentication token 404 using zone information encoded in authentication token 404 to identify the correct data center (which, in this case, EU customer data center 420). IAM ETS 424 then fetches user information such as applicable user entitlements from the data center so that IAM ETS 424 can apply authorization policies.

IAM ETS 424 does not need to store or track these user entitlements or user session information, although IAM ETS 424 may cache user information locally for fast access. Generally, user session information is stored and maintained in the cloud by IAM system 400 (e.g., in global session store 440). Once user 401 is logged in, each subsequent request will include authentication token 404, allowing user 401 to access routes, services, and resources that are permitted with authentication token 404. Periodically, IAM ETS 424 checks with IAM system 400 (e.g., via an API call) to see whether authentication token 404 is still valid and/or whether user 401 has any additional user entitlements that should be fetched.

As described above with reference to FIG. 2, user 401 may wish to access enterprise application 416. The request to access enterprise application 416 is intercepted and provided to IAM ETS 424. IAM ETS 424 is operable to determine that enterprise application 416 runs in another zone hosted in US customer data center 410. Instead of starting a new session, IAM ETS 424 uses the user's existing authentication token 404 for the home zone (e.g., EU) to check with the cloud (e.g., through an IAM cloud service provided by IAM 400) to see if user 401 is allowed (per the user's entitlement) to access enterprise application 416 running in US customer data center 410. If so, a browser on a user device of user 401 is redirected to enterprise application 416. At this time, user 401 is still in the global session. This enables user 401 to have seamless access to multiple applications that are deployed in different regions or data centers, while a global session is maintained in the cloud.

The IAM Extended Trust solution described above provide users with seamless access to applications across regions without replicating policies, session information, or user stores, and without having to share credentials or inserting regulated data into URLs or header. Thus, the IAM Extended Trust solution streamlines cross-border privacy and compliance and enables enterprises to meet data protection regulations such as GDPR.

Figure 5:
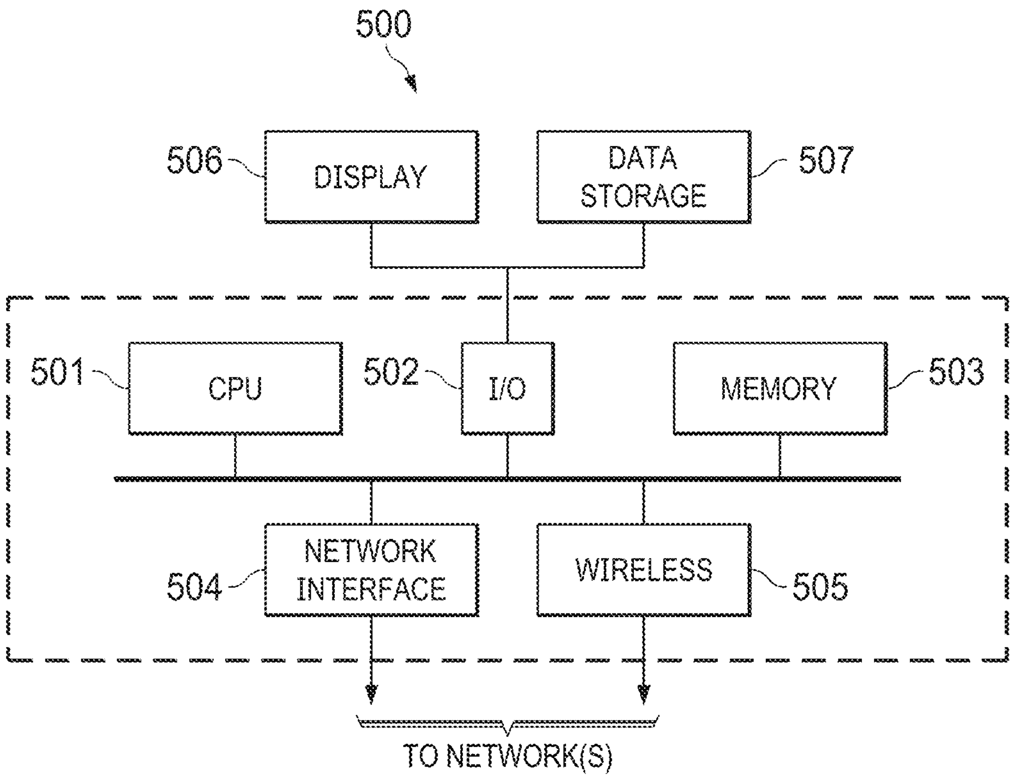
FIG. 5 depicts a diagrammatic representation of a data processing system for implementing an embodiment disclosed herein.

FIG. 5 depicts a diagrammatic representation of a data processing system for implementing an embodiment disclosed herein. As shown in FIG. 5, data processing system 500 may include one or more central processing units (CPU) or processors 501 coupled to one or more user input/output (I/O) devices 502 and memory devices 503. Examples of I/O devices 502 may include, but are not limited to, keyboards, displays, monitors, touch screens, printers, electronic pointing devices such as mice, trackballs, styluses, touch pads, or the like. Examples of memory devices 503 may include, but are not limited to, hard drives (HDs), magnetic disk drives, optical disk drives, magnetic cassettes, tape drives, flash memory cards, random access memories (RAMs), read-only memories (ROMs), smart cards, etc. Data processing system 500 can be coupled to display 506, information device 507 and various peripheral devices (not shown), such as printers, plotters, speakers, etc. through I/O devices 502. Data processing system 500 may also be coupled to external computers or other devices through network interface 504, wireless transceiver 505, or other means that is coupled to a network such as a local area network (LAN), wide area network (WAN), or the Internet.

Those skilled in the relevant art will appreciate that the invention can be implemented or practiced with other computer system configurations, including without limitation multi-processor systems, network devices, mini-computers, mainframe computers, data processors, and the like. The invention can be embodied in a computer, or a special purpose computer or data processor that is specifically programmed, configured, or constructed to perform the functions described in detail herein. The invention can also be employed in distributed computing environments, where tasks or modules are performed by remote processing devices, which are linked through a communications network such as a LAN, WAN, and/or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks). Example chips may include Electrically Erasable Programmable Read-Only Memory (EEPROM) chips. Embodiments discussed herein can be implemented in suitable instructions that may reside on a non-transitory computer readable medium, hardware circuitry or the like, or any combination and that may be translatable by one or more server machines. Examples of a non-transitory computer readable medium are provided below in this disclosure.

Suitable computer-executable instructions may reside on a non-transitory computer readable medium (e.g., ROM, RAM, and/or HD), hardware circuitry or the like, or any combination thereof. Within this disclosure, the term "non-transitory computer readable medium" is not limited to ROM, RAM, and HD and can include any type of data storage medium that can be read by a processor. Examples of non-transitory computer-readable storage media can include, but are not limited to, volatile and non-volatile computer memories and storage devices such as random access memories, read-only memories, hard drives, data cartridges, direct access storage device arrays, magnetic tapes, floppy diskettes, flash memory drives, optical data storage devices, compact-disc read-only memories, and other appropriate computer memories and data storage devices. Thus, a computer-readable medium may refer to a data cartridge, a data backup magnetic tape, a floppy diskette, a flash memory drive, an optical data storage drive, a CD-ROM, ROM, RAM, HD, or the like.

The processes described herein may be implemented in suitable computer-executable instructions that may reside on a computer readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps, and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code an of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more digital computers, by using application specific integrated circuits, programmable logic devices, field programmable gate arrays, optical, chemical, biological, quantum or nano-engineered systems, components, and mechanisms may be used. In general, the functions of the invention can be achieved by any means as is known in the art. For example, distributed, or networked systems, components, and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system, or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any, hardware system, mechanism or component that processes data, signals or other information. A processor can include a system with a central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, including the accompanying appendix, a term preceded by "a" or "an" (and "the" when antecedent basis is "a" or "an") includes both singular and plural of such term, unless clearly indicated otherwise (i.e., that the reference "a" or "an" clearly indicates only the singular or only the plural). Also, as used in the description herein and in the accompanying appendix, the meaning of "in" includes "in" and "on" unless the context clearly dictates otherwise.

Although the foregoing specification describes specific embodiments, numerous changes in the details of the embodiments disclosed herein and additional embodiments will be apparent to, and may be made by, persons of ordinary skill in the art having reference to this disclosure. In this context, the specification and figures are to be regarded in an illustrative rather than a restrictive sense, and all such modifications are intended to be included within the scope of this disclosure. The scope of the present disclosure should be determined by the following claims and their legal equivalents.

What is claimed is:

1. A method for extending web access management across multiple cloud systems, the method comprising:

- provisioning users of a computer network in an identity and access management (IAM) system such that identities of the users are known to the IAM system, wherein the IAM system comprises IAM clouds and an IAM extended trust server (ETS), and wherein the IAM clouds cover multiple geographical zones;
- responsive to a request received by the IAM ETS from a user device to access a resource in the computer network, verifying, with the IAM system, whether a user associated with the user device is authorized to access the resource;
- responsive to a determination that the user is unauthorized to access the resource, directing a browser on the user device to a login page for the user to provide credential information; and
- responsive to the user being authorized to access the resource in the computer network:
  - generating an authentication token, wherein the authentication token is structured with a header section, a claims section, and signature section and wherein the header section contains a header and indicates a signing algorithm, wherein the claims section contains claims, wherein the signature section contains a signature created by encoding the header and the claims and signing using the signing algorithm to produce the signature, and wherein the signature is used to verify whether an accompanying message has been tampered;

starting a global session; and communicating the authentication token to the IAM ETS;

wherein the IAM ETS:

parses the authentication token;

determines, from the multiple geographical zones operated by the IAM clouds and based on information parsed from the authentication token, a home zone for the user;

fetches user-specific session information from the IAM system; and authorizes access by the user to the resource residing in a first geographical zone of the multiple geographical zones operated by the IAM clouds in the global session without having the user to sign in again.

2. The method according to claim 1, further comprising:

detecting a change in the user's credential; and forcing the user to re-authenticate.

3. The method according to claim 1, further comprising:

detecting that the global session has been administratively terminated in one of the IAM clouds; and forcing a logout of the user.

4. The method according to claim 1, further comprising:

intercepting a request from the user device to access an application;

determining that the application is hosted on a server machine running in a data center in a second geographical zone of the multiple geographical zones operated by the IAM clouds;

using the user's authentication token for the home zone to check with the IAM system as to whether the user is authorized to access the application running in the second geographical zone; and responsive to the user being authorized to access the application running in the second geographical zone, directing the browser on the user device to the application with the user being still in the global session.

5. The method according to claim 1, wherein the home zone indicates where the user's identity resides.

6. An identity and access management (IAM) system for extending web access management across multiple cloud systems, the IAM system comprising:

a processor;

a non-transitory computer-readable medium; and instructions stored on the non-transitory computer-readable medium and translatable by the processor for:

provisioning users of a computer network in the IAM system such that identities of the users are known to the IAM system, wherein the IAM system comprises IAM clouds and an IAM extended trust server (ETS), and wherein the IAM clouds cover multiple geographical zones;

responsive to a request received by the IAM ETS from a user device to access a resource in the computer network, verifying whether a user associated with the user device is authorized to access the resource;

responsive to a determination that the user is unauthorized to access the resource, directing a browser on the user device to a login page for the user to provide credential information; and responsive to the user being authorized to access the resource in the computer network:

generating an authentication token, wherein the authentication token is structured with a header section, a claims section, and signature section and wherein the header section contains a header and indicates a signing algorithm, wherein the claims section contains claims, wherein the signature section contains a signature created by encoding the header and the claims and signing using the signing algorithm to produce the signature, and wherein the signature is used to verify whether an accompanying message has been tampered;

starting a global session; and communicating the authentication token to the IAM ETS;

wherein the IAM ETS:

parses the authentication token;

determines, from the multiple geographical zones operated by the IAM clouds and based on information parsed from the authentication token, a home zone for the user;

fetches user-specific session information from the IAM system; and authorizes access by the user to the resource residing in a first geographical zone of the multiple geographical zones operated by the IAM clouds in the global session without having the user to sign in again.

7. The IAM system of claim 6, wherein the instructions are further translatable by the processor for:

detecting a change in the user's credential; and forcing the user to re-authenticate.

8. The IAM system of claim 6, wherein the instructions are further translatable by the processor for:

detecting that the global session has been administratively terminated in one of the IAM clouds; and forcing a logout of the user.

9. The IAM system of claim 6, wherein the instructions are further translatable by the processor for:

intercepting a request from the user device to access an application;

determining that the application is hosted on a server machine running in a data center in a second geographical zone of the multiple geographical zones operated by the IAM clouds;

using the user's authentication token for the home zone to check with the IAM system as to whether the user is authorized to access the application running in the second geographical zone; and responsive to the user being authorized to access the application running in the second geographical zone, directing the browser on the user device to the application with the user being still in the global session.

10. The IAM system of claim 6, wherein the home zone indicates where the user's identity resides.

11. A computer program product for extending web access management across multiple cloud systems, the computer program product comprising a non-transitory computer-readable medium storing instructions translatable by an identity and access management (IAM) system for:

provisioning users of a computer network in the IAM system such that identities of the users are known to the IAM system, wherein the IAM system comprises IAM clouds and an IAM extended trust server (ETS), and wherein the IAM clouds cover multiple geographical zones;

responsive to a request received by the IAM ETS from a user device to access a resource in the computer network, verifying whether a user associated with the user device is authorized to access the resource;

responsive to a determination that the user is unauthorized to access the resource, directing a browser on the user device to a login page for the user to provide credential information; and responsive to the user being authorized to access the resource in the computer network:

generating an authentication token, wherein the authentication token is structured with a header section, a claims section, and signature section and wherein the header section contains a header and indicates a signing algorithm, wherein the claims section contains claims, wherein the signature section contains a signature created by encoding the header and the claims and signing using the signing algorithm to produce the signature, and wherein the signature is used to verify whether an accompanying message has been tampered;

starting a global session; and communicating the authentication token to the IAM ETS;

wherein the IAM ETS:

parses the authentication token;

determines, from the multiple geographical zones operated by the IAM clouds and based on information parsed from the authentication token, a home zone for the user;

fetches user-specific session information from the IAM system; and authorizes access by the user to the resource residing in a first geographical zone of the multiple geographical zones operated by the IAM clouds in the global session without having the user to sign in again.

12. The computer program product of claim 11, wherein the instructions are further translatable by the processor for:

detecting a change in the user's credential; and forcing the user to re-authenticate.

13. The computer program product of claim 11, wherein the instructions are further translatable by the processor for:

detecting that the global session has been administratively terminated in one of the IAM clouds; and forcing a logout of the user.

14. The computer program product of claim 11, wherein the instructions are further translatable by the processor for:

intercepting a request from the user device to access an application;

determining that the application is hosted on a server machine running in a data center in a second geographical zone of the multiple geographical zones operated by the IAM clouds;

using the user's authentication token for the home zone to check with the IAM system as to whether the user is authorized to access the application running in the second geographical zone; and responsive to the user being authorized to access the application running in the second geographical zone, directing the browser on the user device to the application with the user being still in the global session.

* * * * *